Feb. 14, 1933. A. MAYENZET 1,897,136
DEMOUNTABLE RIM FOR PNEUMATIC TIRES
Filed Nov. 3, 1930

Inventor
ALFRED MAYENZET
By J.B.Dickman, Jr.
Attorney

Patented Feb. 14, 1933

1,897,136

UNITED STATES PATENT OFFICE

ALFRED MAYENZET, OF EAST ORANGE, NEW JERSEY

DEMOUNTABLE RIM FOR PNEUMATIC TIRES

Application filed November 3, 1930. Serial No. 493,219.

This invention appertains to motor vehicles and more particularly to a novel demountable rim for pneumatic tires.

One of the primary objects of my invention is to provide a demountable rim for automobile tires in which the tire can be readily and quickly placed on or removed from the rim without difficulty on the part of the operator, and with the expenditure of a minimum amount of time and energy.

Another salient object of my invention is the provision of a sectional demountable tire rim, each of the sections carrying at their opposite edges the tire engaging flanges, the sections being separable one from the other, whereby the tire can be quickly removed from or placed on the rim.

A further important object of my invention is the provision of novel means for forming the sections of the rim, whereby the sections can be readily associated with one another, and whereby a rigid structure will be had which will not pinch the tire in any way and in which the tire will be firmly held in place.

A still further object of my invention is to provide an improved demountable rim for pneumatic tires of the above character, which will be durable and efficient in use, one that will be simple and easy to manufacture, and one which can be placed upon the market at a reasonable cost.

A still further object of my invention is the provision of a demountable rim, parts of which can be used on any existing rims.

With these and other objects in view, the invention consists in the novel construction, arrangement and formation of parts, as will be hereinafter more specifically described, claimed, and illustrated in the accompanying drawing; in which drawing:—

Figure 1:
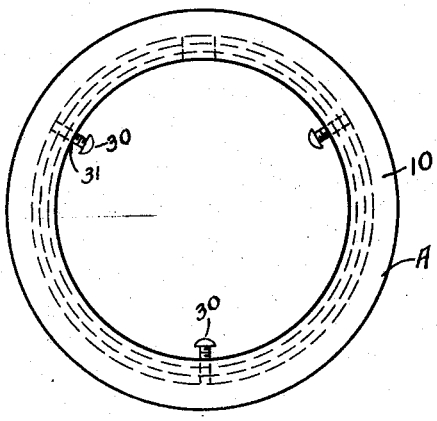
Figure 1 is a side elevation of my improved tire rim.
Figure 2:
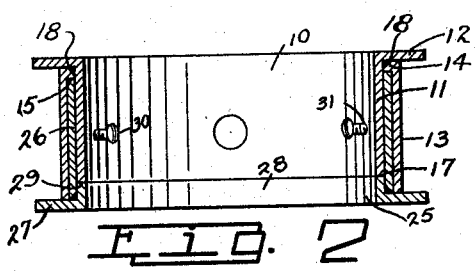
Figure 2 is a diametric section through the rim showing the sections thereof in their assembled position.
Figure 3:
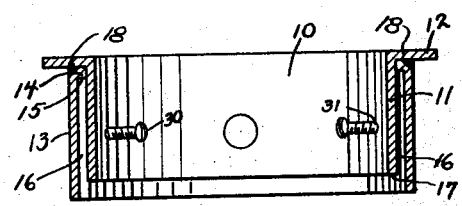
Figure 3 is a view similar to Figure 2 showing the sections in their partly opened position.
Figure 4:
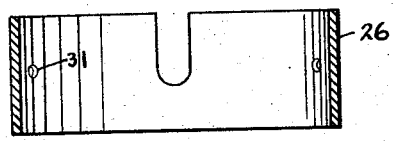
Figure 4 is a diametric section through one portion of one section of the tire rim.

Referring to the drawing in detail, wherein similar reference characters designate corresponding parts throughout the several views, the letter A generally indicates my improved demountable rim, which comprises a pair of companion rim sections 10 and 25. The rim sections 10 includes the annular body 11 having formed on one circumferential edge thereof the tire engaging flange or bead 12, which can be of the straight walled type. The annular body portion 11 receives the tire receiving member 13, which has formed on its inner face the annular rib 14, defining a stop shoulder 15. The rib 14 spaces the tire receiving member 13 from the annular body 11 and defines in connection therewith an annular channel or pocket 16 for a purpose, which will be later described. It is to be noted that the outer edge of the tire receiving member 13 extends beyond the adjacent edge of the annular body 11, and the adjacent edge of the body 11 defines a shoulder 17, for a purpose, which will be later brought out. The inner edge of the tire receiving member 13 and the rib 14 can be beveled as at 18, for snug engagement with the inner face of the tire flange 12 and the tire receiving member 13 is secured to the body 11 and the flange 12 in any preferred way, such as by welding or the like.

The rim section 25 includes the annular attaching portion 26, which is adapted to be slidably received within the channel or pocket 16, as will be more fully pointed out. The outer edge of the annular member 26 receives the tire flange 27 and the inner edge of the tire flange has formed thereon an attaching rib 28, which can be secured to the inner face of the annular member 26. The inner edge of the rib 28 defines a stop shoulder 29, which is adapted to abut against the shoulder 17, when the member 26 is slipped into the channel or pocket 16. The inner edge of the member 26 is adapted to abut against the shoulder 15 at the inner end of the pocket or channel 16, and thus it is to be noted that inward lateral movement of the rim sections 10 and 25 is prevented by the abutment of the inner edge of the member 26 against the shoulder 15 and the abutment of the shoulders 28 and 17.

Accidental displacement of the sections and movement of the sections relative to one another is normally prevented by the use of suitable fastening elements 30, which can be in the nature of screws, these screws are adapted to be placed through registering openings 31 formed in the rim sections as clearly shown in Figure 8 of the drawing.

Figure 5:
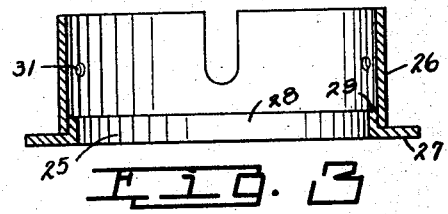
Figure 5 is a diametric section through a part of the other section of the tire rim.

The rim sections can also be provided with the usual tire inflating valve openings, and as shown in Figure 5, the valve opening is channeled for free movement inwardly or outwardly.

In use of my improved rim the fastening elements 30 are removed and the tire is slid on the tire receiving member 13 against the flange 12, it being understood that the section 25 is entirely removed from the section 10. After the tire has been placed on the section 10 over the tire receiving member 13 and against the flange 12, the tire receiving section 25 is brought into play and the member 26 is slid into the channel way 16, in a manner heretofore described, bringing the flange 27 into engagement with the opposite side of the tire from the flange 12. The fastening element can be now reinserted in place and the tire filled with air in the ordinary manner. The rim can now be mounted on the wheel in the usual way.

When it is desired to remove a tire, for any reason, from the rim, the rim is first removed from the wheel, after which the fastening elements 30 are then unthreaded. The tire section 25 is pulled free from the tire section 10 which will allow the free removal of the tire from the rim.

From the foregoing description, it can be seen that I have provided an exceptionally simple and durable type of demountable rim which is separable circumferentially so as to permit the ready association of a tire therewith or the ready removal of a tire therefrom with a minimum amount of effort on the part of the operator.

Changes in details may be made without departing from the spirit or the scope of this invention, but:—

What I claim as new is:

A demountable rim for vehicle tires comprising a pair of separable companion sections, one of which includes an annular body having a rim flange formed on one edge thereof, a tire receiving member having an internal annular rib fitted on the body and secured thereto, said rib abutting the flange, the tire engaging member, the rib and the body forming an annular channel way opening out one side of the mentioned section, the outer edge of the body terminating short of the outer edge of the tire receiving member, the other section including an annular portion slidably received in the channel, and a tire engaging flange having an annular seat fitted in the annular portion, the inner edge of the seat defining a stop shoulder for engaging the outer edge of the body of the first section inward of the tire receiving member, the inner edge of the annular portion of the second section engaging the inner face of the rib, and means detachably locking the sections together.

In testimony whereof, I affix my signature.

ALFRED MAYENZET.